Aug. 5, 1958  E. COPELAND  2,845,896
ANIMAL FEEDING CABINET
Filed May 11, 1956
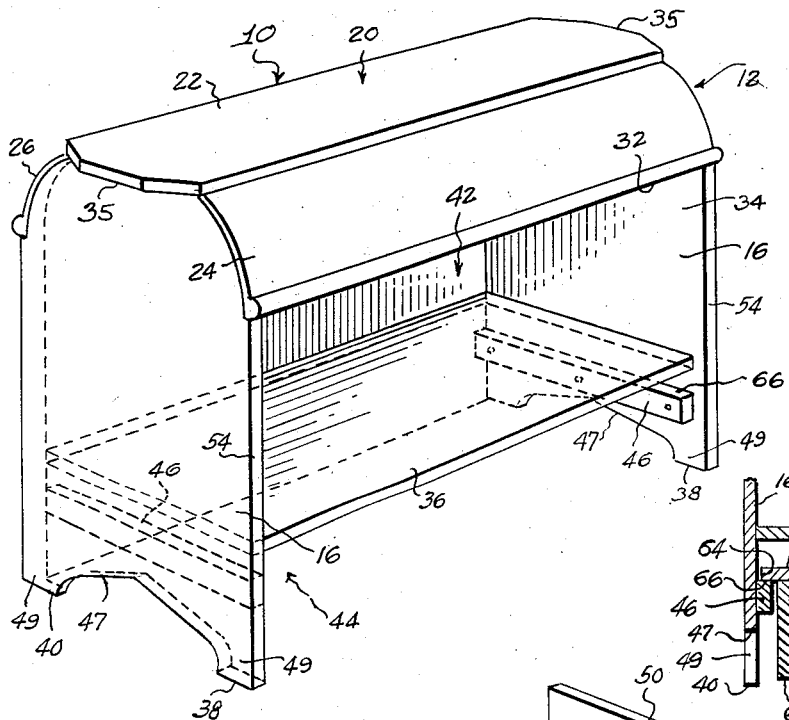
Fig. 1.
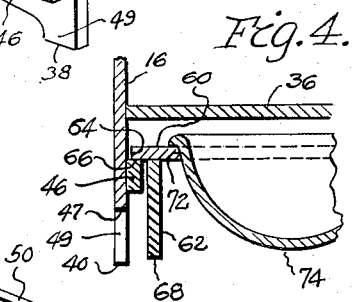
Fig. 4.
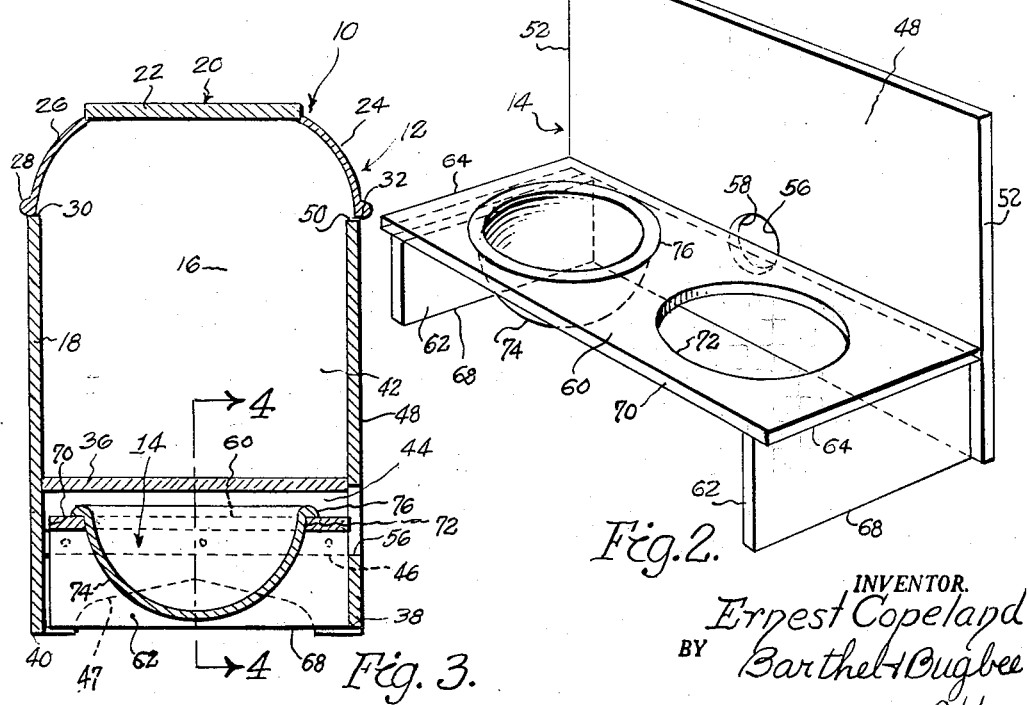
Fig. 2.
Fig. 3.
INVENTOR.
Ernest Copeland
BY Barthel & Bugbee
Attys

United States Patent Office

2,845,896
Patented Aug. 5, 1958

2,845,896

ANIMAL FEEDING CABINET

Ernest Copeland, Mount Clemens, Mich.

Application May 11, 1956, Serial No. 584,259

2 Claims. (Cl. 119—51)

This invention relates to animal feeding cabinets.

One object of this invention is to provide an animal feeding cabinet which is adapted to receive and hold cans or packages of animal food as well as to house a food receptacle holder which normally provides a closure for the cabinet but is adapted to be removed therefrom at feeding time.

Another object is to provide an animal feeding cabinet of the foregoing character having an opening in a vertical wall thereof closed by a panel carrying a movable shelf having an aperture adapted to receive a food or water receptacle and also having a stationary shelf disposed in a plane above the movable shelf, so that the cabinet in its closed position houses the food receptacle or receptacles by receiving the movable shelf below the stationary shelf, thereby simultaneously covering the food or water and protecting it from flies, dirt or other undesired foreign matter, as well as reducing the escape of odors from the food to the room outside the cabinet.

Another object is to provide an animal feeding cabinet of the foregoing character wherein the movable shelf is additionally supported by legs, blocks or plates secured thereto and preferably also to the closure panel, thereby further strengthening the construction of the cabinet and completely concealing the food in the receptacle or receptacles.

Another object is to provide an animal feeding cabinet of the foregoing character having a top wall adapted to function as a foot rest, thereby enabling the cabinet to serve as a foot stool where it is so desired.

Another object is to provide an animal feeding cabinet of the foregoing character wherein the movable or lower shelf is slidably mounted on horizontal bars or battens, the upper edges of which are slightly higher from the floor than the heights of the legs or blocks on the movable shelf, thereby enabling the movable shelf, together with its legs or blocks and closure panel, to be slid into and out of the cabinet casing.

Other objects and advantages of the invention will become apparent during the course of the following description of the accompanying drawings, wherein:

Figure 1 is a perspective view of the casing of the animal feeding cabinet according to one form of the present invention, with the food-holding unit removed;

Figure 2 is a perspective view of the food-holding unit removed from the casing of Figure 1;

Figure 3 is an enlarged vertical cross-section through the cabinet with the casing of Figure 1 and the food-holding unit of Figure 2 brought together into their closed positions; and Figure 4 is an enlarged fragmentary longitudinal section taken along the line 4—4 in Figure 3.

Referring to the drawings in detail, Figure 3 shows in vertical cross-section an animal feeding cabinet, generally designated 10, consisting generally of a casing 12 preferably adapted to serve as a foot stool and a food-holding unit, generally designated 14, adapted to be housed within the casing 12. The casing 12 is formed of any suitable material, such as wood, metal, plastic or the like, and has end walls 16, a vertical rear wall 18, and a top 20 consisting of a substantially flat top wall 22 with downwardly-extending curved upper front and rear walls 24 and 26. The lower edge 28 of the curved upper wall 26 at the rear of the casing 12 rests against the upper edge 30 of the rear wall 18, whereas the lower edge 32 of the corresponding wall 24 at the front forms the upper edge of an access opening 34. The top wall 22 overhangs the end walls 16 to provide handle portions 35 for lifting purposes.

Mounted in the casing 12 between the opposite end walls 16 and the rear wall 18 is a substantially horizontal shelf 36 spaced above the lower edges 38 and 40 of the end wall 16 and rear wall 18 respectively and dividing the interior of the casing 12 into upper and lower chambers 42 and 44 respectively (Figure 3). Secured by nails, screws or other suitable fasteners to the opposite end walls 16 within the lower chamber 44 and spaced slightly below the shelf 36 are parallel slide bars or battens 46 (Figure 1). The lower edges 38 of the end walls 16 are cut away as at 47 to provide feet 49.

The food-holding unit 14 consists of a vertical closure panel 48 adapted to fit over and close the opening 16 in the front of the casing 12 with its upper edge 50 adjoining the lower edge 32 of the forward upper wall 24 and with its side edges 52 overlapping the side edges 54 of the end walls 16 so as to provide substantially complete closure of the upper and lower chambers 42 and 44. The vertical closure panel 48 has a central aperture 56 serving as a hand or finger hole to facilitate grasping the forward edge 58 of a substantially horizontal movable shelf 60 secured to the rearward side of the vertical closure panel 47.

The movable shelf 60 is of a length slightly less than the internal width of the casing 12 between the end walls 16 and of approximately the same depth, but slightly wider than the distance between the slide bars or battens 46 so as to rest upon the latter at its opposite ends and slide back and forth thereon. Mounted beneath the movable shelf 60 and secured both to it and to the vertical closure panel 48 are supporting plates 62 which are spaced slightly inward of the vertical edges 52 of the closure panel 48 and the end edges 64 of the movable shelf 60 to position them slightly inwardly of the slide bars or battens 46 when the cabinet 10 is in its closed position (Figures 3 and 4). The supporting plates 62 are of slightly less height than the height of the upper edges 66 of the slide bars 46 from the lower edges 38 of the feet 49 or end walls 16 so as to space the lower edges 68 of the supporting plates 62 slightly above the floor of the room in which the cabinet 10 is placed (Figure 3) while the cabinet 10 is in its closed position. This construction enables the food-holding unit 14 to be slid easily into and out of the casing 12 with the movable shelf 60 sliding freely along the slide bars or battens 46 (Figures 3 and 4). The movable shelf 60 is of slightly less depth than the depth of the stationary shelf 36 (Figure 3) so that its rearward edge 70 is spaced slightly away from the rear wall 18 of the casing 12 in the closed position of the cabinet 10. One or more horizontally-spaced openings or holes 72 is formed in the horizontal movable shelf 60 (Figure 2) so as to receive food or water receptacles 74 having flanges 76 resting upon the portions of the movable shelf 60 surrounding the openings 72. The openings 72 are spaced horizontally inward from the supporting plates 62 so as to avoid interference between the latter and the receptacles 74.

In the use of the invention, let it be assumed that the food holding unit 14 has been withdrawn from the casing 12 so as to separate them from one another, as shown in Figures 1 and 2, by grasping the movable shelf 60 through the hand hole 56 between the thumb and forefinger, thereby pulling the unit 14 outward. The user then fills the receptacles 74 with food or water, as the case may be. If the animal is to be fed immediately, the user leaves the unit 14 in the position shown in Figure 2, with the receptacles 74 exposed. If, however, the animal is not to be fed immediately, the user lines up the opposite end edges 64 of the movable shelf 60 with the upper surfaces 66 of the slide bars or battens 46 and slides the movable shelf 60 into the space between the slide bars 46 and stationary shelf 36 into the position shown in Figures 3 and 4. The upper chamber 42 is adapted to hold cans or packages of animal food or any other materials or equipment desired, for example, shoe-shining equipment enabling the casing 12 to be used as a foot-stool for use in shining one's shoes. In such a use, the foot is placed on the top wall 42 and the polishing carried out in the ordinary way.

When the food-holding unit 14 is inserted in the casing 12, the cabinet 10 is thus in its closed position and the food is completely out of sight and protected from dirt, flies or other undesirable materials or influences. The user, however, can instantly pull the unit 14 out of the casing 12 into the position shown in Figure 2, in order to feed the animal or give it water.

What I claim is:

1. A food holding unit for animals comprising a shelf-like member having at least one opening therethrough embracing a food receptacle, supports for said member comprising a vertical member adjacent each end thereof and extending downwardly therefrom, said supports being spaced inwardly from the ends of said member, and a back board in contact with one side edge of said member and with the ends of said supportes.

2. A food holding unit for animals, according to claim 1, wherein there is also provided a box-shaped casing having side walls and a top wall enclosing a chamber adapted to receive said shelf-like member, one of said side walls having an access opening therein of a size adapted to be closed by said back board, two of said side walls opposite one another having substantially horizontal parallel supporting bars adapted to slidably receive and engage said shelf-like member and having their shelf-like member-engaging surfaces disposed above the bottom of said casing at a height slightly greater than the height of said vertical members.

References Cited in the file of this patent

UNITED STATES PATENTS

| 2,555,396 | Cosner | June 5, 1951 |
| 2,659,344 | Herbert | Nov. 17, 1953 |
| 2,659,345 | Herbert | Nov. 17, 1953 |